United States Patent [19]

Stoller et al.

[11] 4,225,276
[45] Sep. 30, 1980

[54] FIFTH WHEEL FOR RAILWAY TRAILER HITCH INCLUDING A ONE-WAY GATE

[75] Inventors: Patricia S. Stoller, Plymouth, Mich.; James C. Hammonds, St. Charles; Ronald D. Van Dyke, Florissant, both of Mo.

[73] Assignee: ACF Industries, Inc., New York, N.Y.

[21] Appl. No.: 9,334

[22] Filed: Feb. 5, 1979

[51] Int. Cl.³ .......................... B60D 1/12; B60P 7/08; F16B 9/00
[52] U.S. Cl. .................................. 410/64; 248/119 S; 280/432; 280/436
[58] Field of Search ..................... 105/368 S; 280/432, 280/433, 436, 437; 410/64; 248/119 S

[56] References Cited
U.S. PATENT DOCUMENTS

| 2,411,404 | 11/1946 | Ivinn | 280/432 |
| 3,346,223 | 10/1967 | Broling | 105/368 S |

Primary Examiner—John J. Love
Assistant Examiner—Randall A. Schrecengost
Attorney, Agent, or Firm—Henry W. Cummings

[57] ABSTRACT

A trailer hitch head or fifth wheel is disclosed including a pair of jaws which engage the kingpin of a trailer to hold the kingpin in place. The jaws are held in closed position by a locking member which is biased to the engaged position by at least one stiff spring. A linkage engages the locking member to move the locking member to open position against the bias of the stiff spring. The linkage may be manually or automatically activated. A one-way kingpin gate is located in the front portion of the fifth wheel. The linkage engages an actuator which automatically engages the one-way gate and pivots the same to open position allowing exit of the kingpin. Preferably the linkage is automatically activated by a bumper bar linkage in a tractor operated hitch, and also may be manually activated by the operator. Optionally, a manually operable handle is provided including a keeper or projection which engages a slot in the locking member in open position to hold the locking member in open position.

18 Claims, 23 Drawing Figures

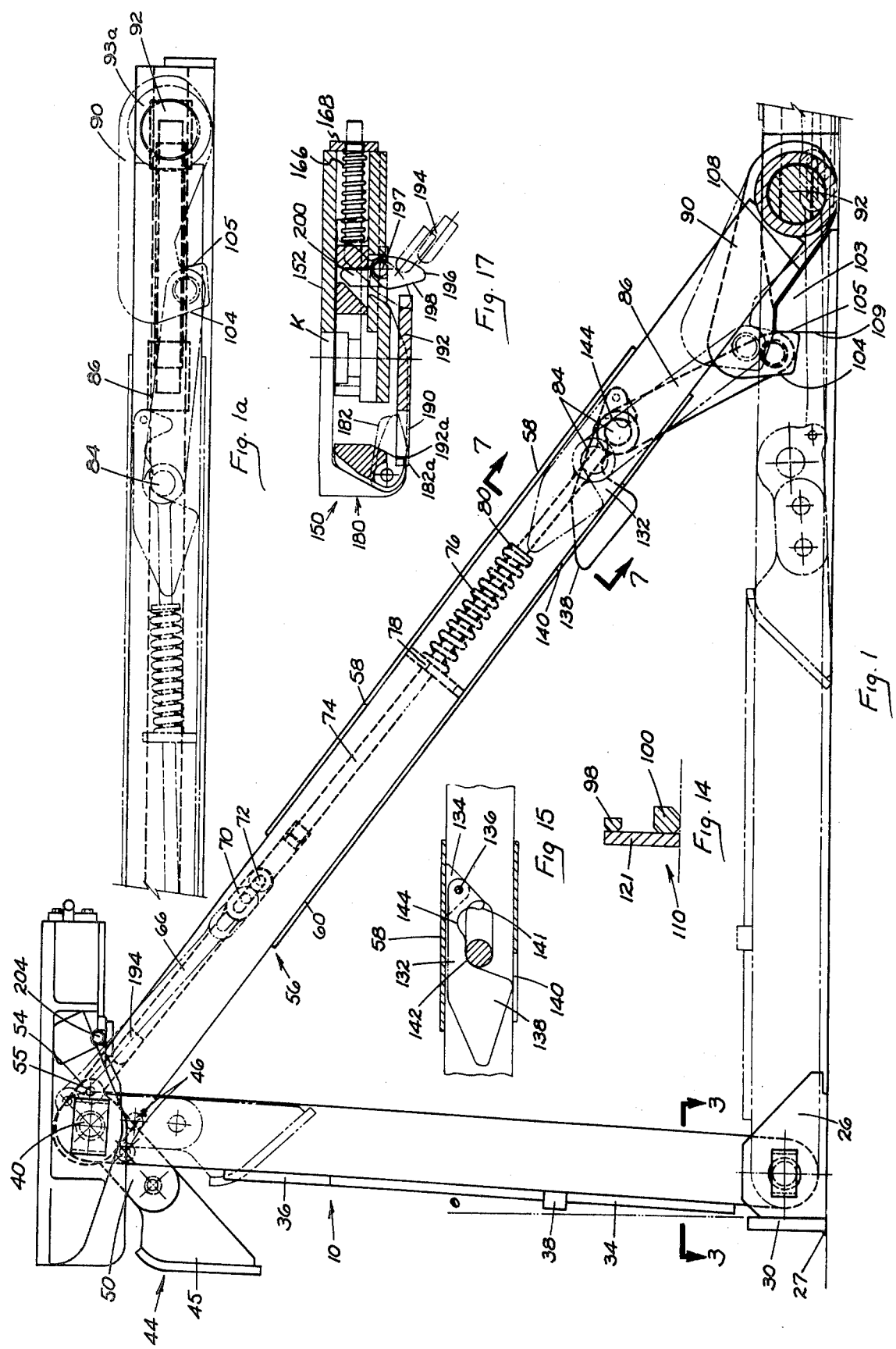

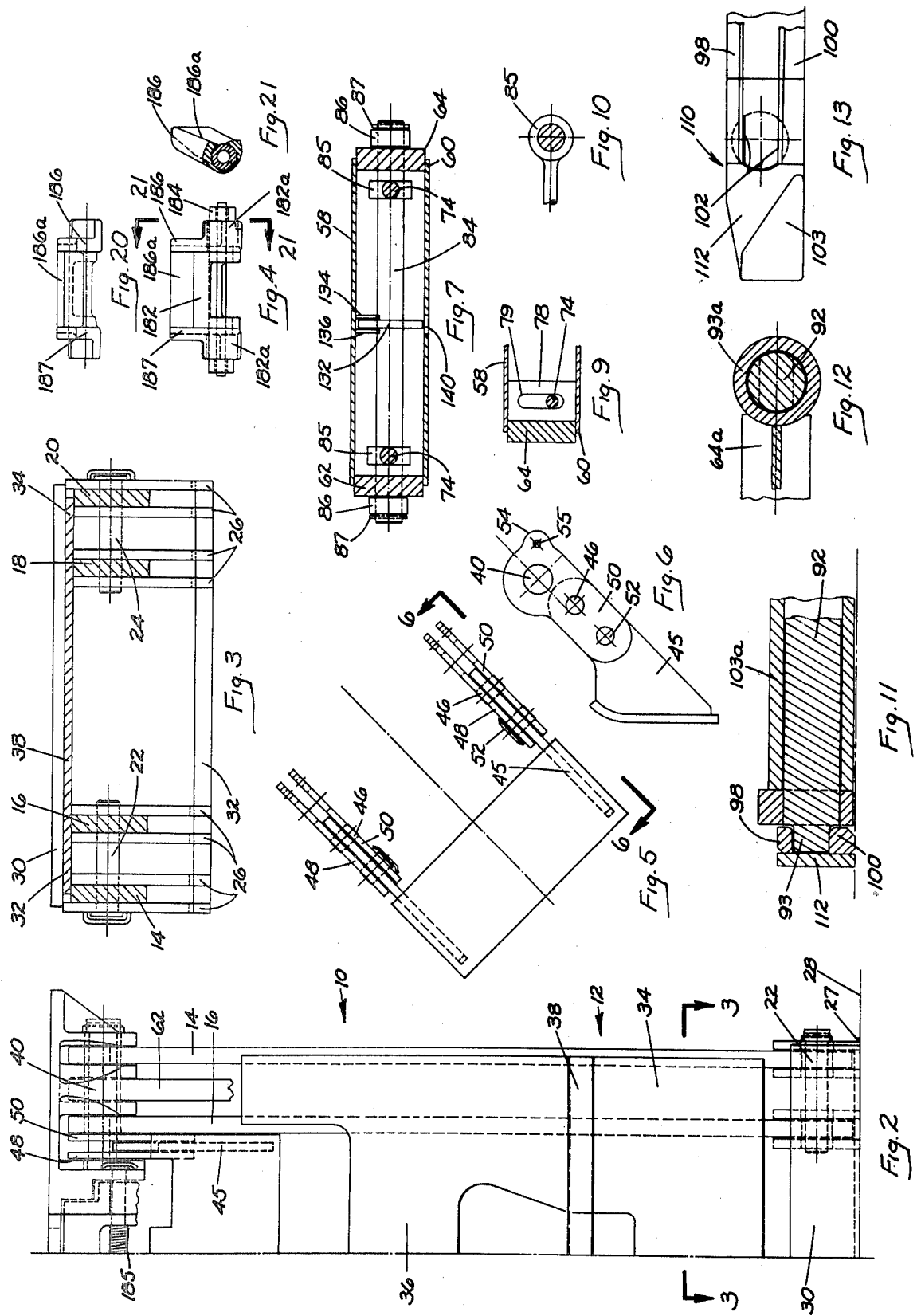

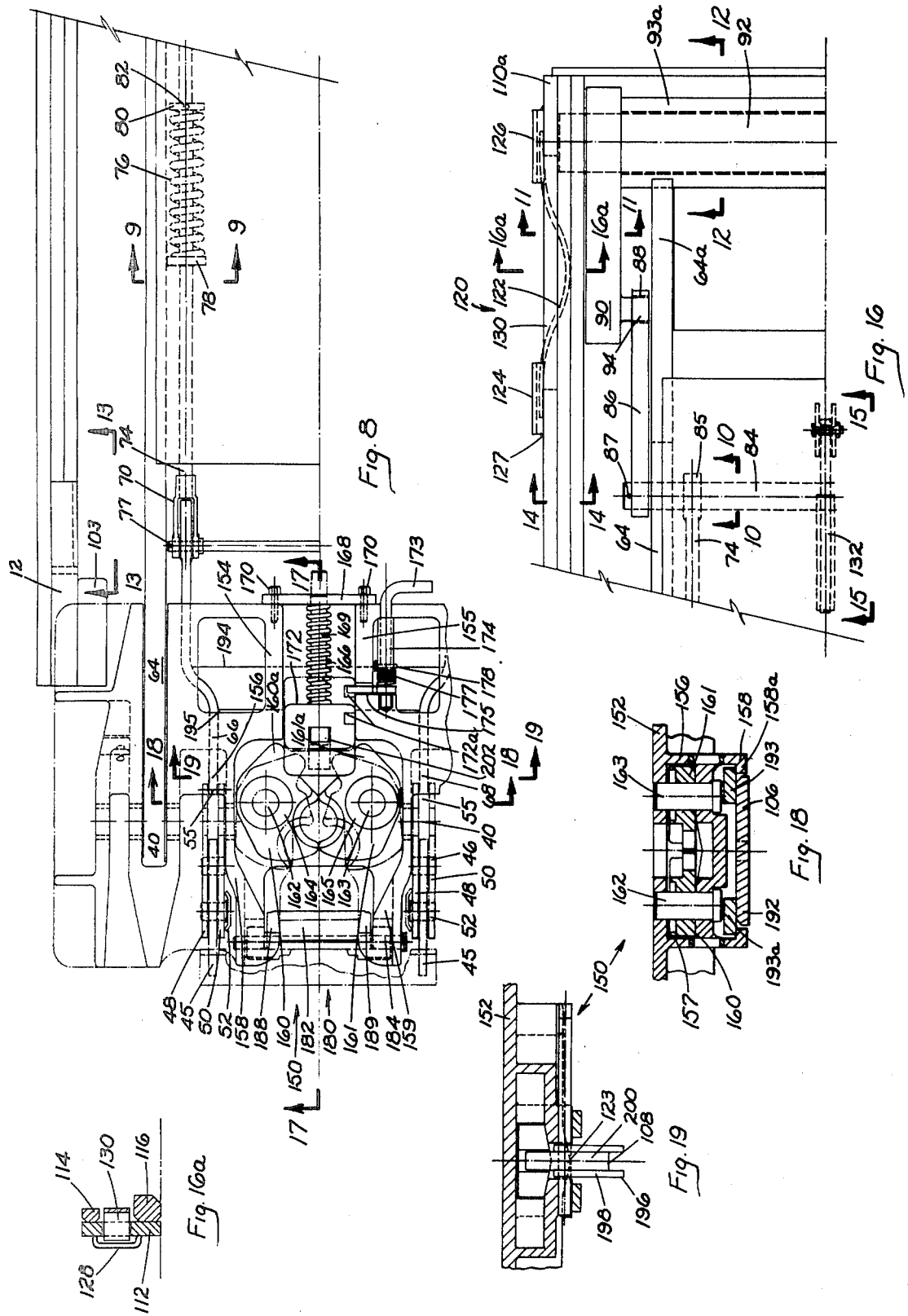

FIFTH WHEEL FOR RAILWAY TRAILER HITCH INCLUDING A ONE-WAY GATE

BACKGROUND OF THE INVENTION

In U.S. Pat. No. 3,632,145, a trailer hitch head or fifth wheel is disclosed including a locking member which engages a pair of jaws to hold the jaws in closed position engaging the kingpin of a trailer. The locking member is manually movable against the bias of a stiff spring to an open jaw position to allow entry or exit of the kingpin from the jaws. In open position vertically movable keepers biased to an engaged position with the locking member hold the locking member in open position so that the operator can drive the trailer into or out of the hitch.

However, this construction requires that the locking member be manually moved to the open position until the vertically movable keepers are released to hold the locking member in open position.

In U.S. Pat. No. 3,892,426 a one-way gate for a trailer hitch head or fifth wheel is disclosed. However, in this construction, the one-way gate must be manually moved to open position which allows the kingpin to exit.

SUMMARY OF THE INVENTION

A trailer hitch head or fifth wheel is disclosed including a pair of jaws which engage the kingpin of a trailer to hold the kingpin in place. The jaws are held in closed position by a locking member which is biased to the engaged position by at least one stiff spring. A linkage engages the locking member to move the locking member to open position against the bias of the stiff spring. The linkage may be manually or automatically activated. A one-way kingpin gate is located in the front portion of the fifth wheel. The linkage engages an actuator which automatically engages the one-way gate and pivots the same to open position allowing exit of the kingpin. Preferably the linkage is automatically activated by a bumper bar linkage in a tractor operated hitch, and also may be manually activated by the operator. Optionally a handle is provided including a keeper or projection which engages a slot in the locking member in open position to hold the locking member in open position. It is preferred that the bumper bar linkage also release the hitch from operational, elevated position to a retracted position to provide ease of operation for the hitch operator.

THE DRAWINGS

FIG. 1 is a vertical side elevation view of the trailer hitch of the present invention;

FIG. 1A is a vertical side elevation view and a continuation of the right hand portion of FIG. 1.

FIG. 2 is a partial vertical end view of the trailer hitch of the present invention;

FIG. 3 is a horizontal sectional view looking in the direction of the arrows along the line 3—3 in FIGS. 1 and 2;

FIG. 4 is a detail view of the one-way gate in the hitch head.

FIG. 5 is a detail plan view of the bumper bar assembly;

FIG. 6 is a side elevation view of the bumper bar assembly shown in FIG. 5.

FIG. 7 is a sectional view looking in the direction of the arrows along the line 7—7 in FIG. 1.

FIG. 8 is a partial plan view including the hitch head and the diagonal strut of the trailer hitch of the present invention;

FIG. 9 is a sectional view looking in the direction of the arrows along the line 9—9 in FIG. 8;

FIG. 10 is a sectional view looking in the direction of the arrows along the line 10—10 in FIG. 16;

FIG. 11 is a vertical sectional view looking in the direction of the arrows along the line 11—11 in FIG. 16;

FIG. 12 is a vertical sectional view looking in the direction of the arrows along the line 12—12 in FIG. 16;

FIG. 13 is a side elevation view looking in the direction of the arrows along the line 13—13 in FIG. 8;

FIG. 14 is a vertical sectional view looking in the direction of the arrows along the line 14—14 in FIG. 16;

FIG. 15 is an enlarged detail view of the indicating member assembly looking in the direction of the arrows along the line 15—15 in FIG. 8;

FIG. 16 is a plan view of the lower right hand portion of FIG. 8 illustrating a resilient device to retard movement of the hitch to the retracted position;

FIG. 16A is a sectional view looking in the direction of the arrows along the line 16A—16A in FIG. 16;

FIG. 17 is a vertical sectional view looking in the direction of the arrows along the line 17—17 in FIG. 8;

FIG. 18 is a vertical sectional view looking in the direction of the arrows along the line 18—18 in FIG. 8;

FIG. 19 is a vertical sectional view looking in the direction of the arrows along the line 19—19 in FIG. 8;

FIG. 20 is a plan view of the one-way gate illustrated in FIG. 4; and

FIG. 21 is an end elevation view partly in section looking in the direction of the arrows along the line 21—21 in FIG. 4.

DESCRIPTION OF PREFERRED EMBODIMENTS

The trailer hitch of the present invention is indicated in the drawings generally at 10. The hitch includes a vertical strut indicated at 12 including four vertical plates 14, 16, 18 and 20 (FIG. 3). The plates extend vertically from a pair of pivot pins 22 and 24, passing through the plates and through base lugs 26 welded at 27 to the car deck 28. In addition, tie plates 30 and 32 extend along the front and back of lugs 26 parallel to pivot pins 22 and 24. Transverse end plates 34 and 36 are welded to vertical plates 14, 16, 18 and 20 and extend along the end of the hitch as shown in FIGS. 1 and 2.

A lifting bar 38 is provided at the end of the hitch to be used in raising the hitch to upright position as will be described hereinafter. It is to be noted from FIG. 1, angle $\theta$, that vertical strut 12 is inclined with respect to the vertical from one (1) to five (5) degrees to ensure that the hitch will pivot from left to right in FIG. 1 to assume the retracted position to be described hereinafter.

Vertical strut plates 14, 16, 18 and 20 at their upper ends are pivoted about upper pivot pins 40. Pivoted about pin 40 is a bumper block assembly 44. As shown in FIGS. 5 and 6, bumper block assembly 44 includes bumper block 45 and bumper block supports 48 and 50 pivoted about a pivot pin 46. In addition, a separate pin 52 extending between bumper block supports 48 and 50 and bumper block 44 is provided. If too great a bumper force is applied by the tractor, allowing bumper block 45 to pivot about pin 40, pin 52 will shear off, thereby avoiding damaging the remaining parts of the operating linkage of the hitch. It is a simple matter to replace pin 52, and replace bumper block 45 into the position shown in FIGS. 1, 5 and 6.

On either side of the hitch, transversely spaced connecting lugs 54 are provided on bumper block supports 48 and 50. A diagonal strut indicated generally at 56 is attached to respective connecting lugs 54. Pins 55 connect bars 66 and 68 which are connected to lugs 54 (FIG. 8). As shown in FIGS. 1 and 7, the diagonal strut includes upper cover plates 58, lower cover plate 60, and transversely spaced diagonal strut side plates 62 and 64. Side plates 62 and 64 are pivotably mounted about pins 40 as shown in FIGS. 2 and 8. Bars 66 and 68 are each attached to a clevis 70 with a clevis pin 72 (FIGS. 1 and 8). Rods 74 are threaded into the opposite ends of each of the clevises 70. A compression spring 76 surrounds each of the rods 74, held in place with a first spring plate 78 attached to cover plates 60, and a second spring plate 80 attached to rod 74 with a pin 82. A similar clevis and spring arrangement is provided for bar 66 on the other side of the diagonal strut. As shown in FIG. 9, rods 74 are vertically movable within a seat 79 provided in plate 78.

Rods 74 are attached to a shaft 84 with a slip fit as indicated in FIG. 10 at 85. At opposite ends of shaft 84, connecting links 86 are located outboard of diagonal strut plates 62 and 64 (FIG. 7), held in place respectively with fasteners 87. Each of the connecting links 86 include an opening 88 (FIG. 16). Sidewalls 62 and 64 include lower extensions 64a, one of which is indicated in FIG. 16.

A pair of transversely spaced movable locking lugs or hooks 90 are pivotally mounted about a diagonal strut pivot pin 92 (FIGS. 1 and 8). Movable locking lugs 90 include lateral projections 94 which are inserted into opening 88 in links 86 (FIG. 8). As shown in FIG. 11, the opposite ends 93 of diagonal strut pivot pin 92 are located within vertically spaced guides 98 and 100, each in turn welded to vertical plate 112. Pivot pin 92 is mounted within a tube 93a (FIG. 12) within which pivot pin 92 rotates. Furthermore, as shown in FIG. 13, portions 94 of shaft 92 are cut off to fit within guides 98 and 100. FIG. 13 also shows a fixed locking lug 103 welded to the deck to which is attached vertical plate 112.

Movable locking lug 90 includes a cam surface 104 and a locking surface 105. Fixed locking lug 103 includes a cooperating cam surface 108 and a cooperating locking surface 109. When the hitch is moved into the upright position when the tractor engages lifting bar 38, the movable locking lug cam surface 104 moves along fixed locking lug cam surface 108 and then drops into the locked position with locking surfaces 105 and 109 abutting as shown in FIG. 1 in solid lines.

As shown in FIGS. 13 and 14, retracted position guides indicated generally at 110 include vertically extending plate 112 welded to the car deck and to horizontally extending, vertically spaced guides 98 and 100. It will be apparent that when the tractor contacts bumper block 44 and pivots lug 54 about pin 40, as shown in dotted lines in FIG. 1, diagonal strut rods 66 and 68 are moved counter-clockwise and upwardly. This lifts rods 74, shaft 84, and links 86 upwardly from right to left in FIGS. 1 and 8. This in turn moves movable locking lug 90 vertically and clockwise about pivot pin 92, as also shown dotted in FIG. 1. When this occurs, due to the inclination of the vertical strut about pivot pins 22 and 24, the entire hitch moves downwardly from left to right with the end portions 93 of shaft 92 following the guide assembly to the end portions 110a of deck guide portions 110. FIG. 1 shows the pivot shaft 92 and the movable locking lug 90 in the upright position, and FIG. 1A shows the hitch in the retracted position.

An indicator 132 is pivotally mounted about cover plate 58 by means of a pair of brackets 134 and a pivot pin 136 extending therebetween (FIGS. 1, 7 and 15). The lower portion 138 of the indicator is movable within a slot 140 within bottom cover plate 60. The word "LOCKED" is printed upon the lower portion 138 (FIG. 1). Indicator 132 includes a slot 141 and a lower surface 142. Shaft 84 engages a camming surface 144 in slot 141. Indicator 132 then pivots by gravity and/or engagement of shaft 84 with camming surface 144 about pivot pin 136, whereby indicator 132 again moves outwardly through slot 140 to indicate that the hitch is now locked in the upright position, and the words "LOCKED" are again viewable as shown in FIG. 1.

Compression spring 76 biases movable locking lug 90 into the upright locked position engaging fixed locking lug 106. Thus, the tractor engaging bumper bar 44 must overcome the bias of spring 76 when connecting lug 54 is rotated counter-clockwise about pin 40. When connecting lug 54 pulls rods 66 and 68 upwardly and counter-clockwise, shaft 84 is lifted and moved from right to left. This necessitates relative vertical movement between rod 74 and shafts 66 and 68. This is accomplished by clevis rod 74 moving vertically within slot 79 as shown in FIG. 9.

To retard the movement of the hitch to retracted position, a spring assembly indicated generally at 120 is optionally provided. As shown in FIGS. 1 and 16, this spring assembly includes a leaf spring 122, attached with leaf spring holders 124 and 126 to vertical guide member 112. Leaf spring holders may be attached to guide member 112 by welding as shown at 127, or with fasteners. A keeper 128 is welded to vertical guide 112 and a slot 130 is provided in vertical guide 112. The end portions 93 (FIG. 11) of the pin 92 contact leaf spring 122 and depress the same and move it laterally as the spring retards the movement of the hitch as it assumes the retracted position. Since pin 92 is beyond spring 122 in its fully retracted position, it does not interfere with the complete retraction of the hitch.

When bumper bar 44 pivots lug 54 about pin 40, and diagonal strut rods 66 and 68 are moved counter-clockwise and from left to right in FIG. 1, rods 74 and shaft 84 are moved upwardly, and shaft 84 moves into engagement with the lower surface 142 of indicator 132. This pivots indicator 132 about pivot pin 136 and end portion 138 moves upwardly through slot 140 and into diagonal strut 56. Indicating member 132 remains within the diagonal strut in the position shown in FIG. 15 throughout the time that the hitch is in the retracted position.

When the hitch is moved from right to left in FIG. 1, with the tractor engaging lifting bar 38, the diagonal strut moves from right to left in FIG. 1 until surface 104 on movable locking lug 90 drops vertically and surface 105 engages the locking surface 109 on fixed lug 103. Links 86 then assume the position shown in solid lines. Shaft 84 engages indicator 138 at 141 to pivot the same from the position shown in dotted lines in FIG. 1 to the position shown in solid lines.

In accordance with the present invention, the hitch head is indicated in the drawings generally at 150 in FIGS. 8, 18 and 19. The head includes a top plate 152 and a pair of rear head portions 154 and 155. A pair of vertical webs 156 and 157 extend forwardly to gate connecting portions 158 and 159. A pair of jaws 160 and 161 are pivotally mounted about a pair of shafts 162 and 163 (FIGS. 8 and 18). Torsion springs 164 and 165 bias the jaws 160 and 161 to the open position. A stiff spring 166 is attached to a locking member 172 by means of a plate 168 and spring shaft 169. Fasteners 170 hold plate 168 attached to rear head portions 154 and 155. Spring 166 biases locking member 172 into the forward position which engages jaws 160 and 161, and holds the jaws in closed position in engagement with a kingpin K (FIG. 17).

When the locking member 172 is moved from left to right in FIG. 8, the jaws 160 and 161 open and the kingpin can be removed. Locking member 172 includes a slot 172a, and a handle 173 extends into an opening 174 in head portion 155. A torsion spring 177 held in place with a pin 178 biases keeper 175 out of engagement with slot 172a. However, handle 173 may be manually rotated to move keeper 175 into engagement with slot 172a, as shown dotted in FIG. 8, and hold locking member 172 out of engagement with jaws 160 and 161 to allow exit of kingpin K from jaws 160 and 161. In the absence of locking member 172 and spring 166, torsion springs 163 and 164 bias the jaws to the open position. However, if the kingpin is in place, the kingpin prevents the complete opening of the jaws by engaging the rear portion thereof.

Jaws 160 and 161 each include rear lug portions 160a and 161a. When the kingpin exits from the head, the lug portions 160a and 161a engage locking member 172 and move it from left to right in FIG. 2 a distance sufficient for keeper 175 to pivot out of slot 176 under the bias of torsion spring 177. Thus, locking member 172 assumes a position engaging the rear jaw lugs 160a, 161a, holding jaws 160 and 161 in open position as shown in dotted lines in FIG. 8, ready to receive another kingpin.

A one-way gate indicated generally at 180 includes a gate member 182 pivotally mounted about a gate shaft 184. Shaft 184 is rotatably mounted on gate connecting portions 158 and 159. A torsion spring 185 (FIG. 2) biases gate member 182 into the generally vertical position shown in FIG. 17. As shown in FIGS. 4, 20 and 21, a transverse web 186a connects stop portions 186 and 187. Stop portions 186 and 187 of gate member 182 engage web portions 188 and 189 of gate connecting portions 158 and 159 to prevent movement of the one-way gate in a counter-clockwise direction (FIG. 8). However, gate member 182 is capable of clockwise movement about shaft 184 in FIG. 17, and a slot 190 is provided in one-way gate actuating plate 192 for gate 182 to pass through.

A head actuator 194 is rigidly connected to rods 66 and 68 by welding as indicated at 195 (FIG. 8) or with fasteners. Actuator 194 is adapted to engage one-way links 196. Links 196 are free to pivot about a shaft 197. Links 196 each include a cam surface 198 which engages actuating plate 192 (FIG. 17). A second actuator link 200 is secured to shaft 197 and extends upwardly through a slot 202 in locking member 172.

As shown in FIG. 18, head portion 158 includes horizontal extensions 158a upon which projections 193 and 193a welded to actuating plate 192 ride in moving longitudinally relative to the head between engaged and disengaged positions with one-way gate 182. Projections 193 and 193a support vertical pins 162 and 163 and are of sufficient length that when the actuating plate 192 is in the forward, engaged position in FIGS. 4 and 14, pins 162 and 163 are nonetheless supported.

It is thus apparent that, when bumper block 45 is actuated by a tractor and link 54 is pivoted about shaft 40 counterclockwise, in addition to rods 66 and 68 moving upwardly, head actuator 194 also moves upwardly and engages link 196, pivoting the same about shaft 197. This causes cam surface 198 to engage gate actuating plate 192, moving plate 192 from right to left in FIG. 17, whereby end 192a engages gate member 182 at 182a and gate 182 is pivoted about shaft 184 through slot 190 so that the kingpin of a trailer may move from right to left in FIGS. 1, 8 and 17. Furthermore, link 200 moves locking member 172 from left to right against the bias of stiff spring 166 to the position shown in dotted lines in FIG. 8 which enables the jaws 160 to pivot about the shafts 162, 163 under the bias of torsion springs 164 and 165 as discussed hereinabove, and assume the open position. Thus, activation of the bumper bar 44 by a tractor not only causes movement of the hitch from the extended operational position to the retracted position, but also one-way gate 180 is moved to the open position to allow removal of the kingpin, and locking member 172 is moved to the open position to allow the jaws to move to the open position to disengage the kingpin.

Shaft 197, at its outer end (FIG. 1), includes a connection portion 204, for example, of hexagon shape. Connection portion 204 is adapted to receive a suitable tool to pivot link 200, which is rigidly attached to shaft 197. Link 200 moves locking member 172 from left to right against the bias of spring 166 to enable torsion springs 164 to open jaws 160. It will be apparent that this manual operation does not require contact with head actuator 194. Manual unlocking of the kingpin is possible when the hitch is in the upright position, particularly for crane-operated, vertical unloading.

It is to be noted that actuation of shaft 197 in this manner does not activate one-way gate 182 because links 196 are free to rotate on shaft 197. Thus, even if locking member 172 is opened to allow jaws 160 and 161 to open for crane unloading, one-way gate 182 remains in place as a secondary lock.

What is claimed is:

1. A trailer hitch head comprising:
 a pair of jaws which engage the kingpin of a trailer to hold the kingpin in place; said jaws held in closed position by a locking member which is biased to an engaged position with said jaws by at least one stiff spring; a head linkage adapted to engage the locking member to move the locking member to open position against the bias of said stiff spring; a one-way kingpin gate located in the front portion of said head; said head linkage adapted to engage a gate actuator which automatically engages said one-way gate and pivots the same to open position allowing exit of the kingpin; a handle located in the rear portion of said head having a keeper which engages a slot in said locking member when said locking member is in open position to hold the locking member in open position.

2. A trailer hitch according to claim 1 wherein at least one of said jaws has a rear lug portion which engages said locking member when said locking member is held in place by said keeper and releases said locking member from said keeper and allows said locking member to return to engaged position with said jaws.

3. A railway trailer hitch comprising:
a vertical strut and a diagonal strut supporting a trailer hitch head including a pair of jaws in said head which engage the kingpin of a trailer to hold the kingpin in place; said jaws held in closed position by a locking member which is biased to an engaged position with said jaws by at least one stiff spring; a head linkage adapted to engage the locking member to move the locking member to open position against the bias of said stiff spring; a one-way kingpin gate located in the front portion of said head; said head linkage adapted to engage a gate actuator which engages said one-way gate and pivots the same to open position allowing exit of the kingpin; said head linkage being automatically activated by a bumper bar linkage in said hitch.

4. A trailer hitch according to claim 3 including means for manually activating said locking member by the operator.

5. A trailer hitch according to claim 3 including linkage means associated with said bumper bar linkage which releases said hitch from operational, elevated position to a retracted position.

6. A trailer hitch according to claim 5 wherein said bumper bar linkage includes a transversely extending bar adapted to engage a one-way gate actuator located in said hitch head.

7. A trailer hitch according to claim 6 wherein said one-way gate actuator comprises at least one elongated cam having a cam surface which engages a one-way gate plate to pivot said gate to open position.

8. A trailer hitch according to claim 5 wherein said bumper bar linkage includes a generally vertically extending finger adapter to engage said locking member to move the same to open position to allow said jaws to open.

9. A trailer hitch according to claim 8 wherein said finger is rigidly attached to an operating shaft.

10. A trailer hitch according to claim 7 wherein said elongated cam is mounted for free rotation upon an operating shaft.

11. A trailer hitch according to claim 10 wherein said operating shaft is rigidly attached to an elongated finger which moves said locking member between open and closed position.

12. A trailer hitch head comprising:
a pair of jaws pivotably mounted and movable between a closed position holding in place a kingpin of a highway trailer and an open position allowing said kingpin to exit; said jaws including laterally spaced rear slots which are engaged by a generally horizontally moving locking member to hold said jaws in said closed position; resilient means biasing said locking member into engagement with said jaws; said locking member being movable longitudinally of said jaws to a position out of engagement with said jaws which allows said jaws to assume said open position and said kingpin to exit; means for maintaining said locking member out of engagement with said jaws; said jaws further comprising rear locking lugs which are engaged by said locking member in an intermediate position to hold said jaws in a full open position upon release of said means for maintaining said locking member out of engagement with said jaws.

13. A trailer hitch according to claim 12 wherein the means for maintaining said locking member out of engagement with said jaws comprises a keeper which engages said locking member.

14. A trailer hitch head according to claim 13 wherein said keeper is manually operable and includes a handle extending outside of said head.

15. A trailer hitch head according to claim 14 wherein said keeper is biased to a position out of engagement with said locking member with a keeper resilient means.

16. A trailer hitch head according to claim 15 wherein said keeper resilient means comprises a torsion spring.

17. A railway trailer hitch comprising:
a vertical strut and a diagonal strut supporting a trailer hitch head including a pair of jaws in said head which engage the kingpin of a trailer to hold the kingpin in place; said jaws held in closed position by a locking member which is biased to an engaged position with said jaws by at least one stiff spring; a head linkage adapted to engage the locking member to move the locking member to open position against the bias of said stiff spring; a one-way kingpin gate located in the front portion of the fifth wheel; said head linkage adapted to engage a gate actuator which engages said one-way gate and pivots the same to open position allowing exit of the kingpin; said head linkage being automatically activated by a bumper bar linkage located in said tractor operated hitch; said head linkage comprising at least one enlongated cam having a cam surface which engages said gate actuator to move said gate actuator longitudinally and into engagement with said gate to pivot said gate to open position; said head linkage further including a generally vertically extending finger adapter to engage said locking member to move the same to open position to allow said jaws to open.

18. A railway trailer hitch according to claim 17 wherein said cam is mounted on a transversely extending operating shaft and is free to rotate thereon, and wherein said finger is rigidly connected to said shaft whereby said shaft may be rotated to manually open said jaws and whereby said cams will rotate about said shaft and will not actuate said gate actuator and said gate will remain closed during such manual opening of said jaws by said shaft.

* * * * *